(12) United States Patent
Guest et al.

(10) Patent No.: US 7,506,658 B2
(45) Date of Patent: Mar. 24, 2009

(54) LIQUID FLOW CONTROL DEVICES

(75) Inventors: John Derek Guest, Bray (GB); Timothy Stephen Guest, Bray (GB)

(73) Assignee: John Guest International Limited, West Drayton (GB)

( * ) Notice: Subject to any disclaimer, the term of this patent is extended or adjusted under 35 U.S.C. 154(b) by 0 days.

(21) Appl. No.: 11/463,267

(22) Filed: Aug. 8, 2006

(65) Prior Publication Data

US 2007/0034255 A1 Feb. 15, 2007

(30) Foreign Application Priority Data

Aug. 11, 2005 (GB) ................... 0516530.3

(51) Int. Cl.
*A01G 25/00* (2006.01)
(52) U.S. Cl. .................. 137/78.3; 137/78.2; 251/12
(58) Field of Classification Search .............. 137/78.3, 137/883, 78.2, 67, 68.11, 455; 251/12–14
See application file for complete search history.

(56) References Cited

U.S. PATENT DOCUMENTS

| | | | | | |
|---|---|---|---|---|---|
| 2,633,131 | A | * | 3/1953 | Grosvenor, Jr. | ............... 137/67 |
| 3,204,872 | A | * | 9/1965 | Whear | ...................... 137/78.3 |
| 3,298,391 | A | * | 1/1967 | Savage | ........................ 137/493 |
| 3,426,539 | A | * | 2/1969 | Whear | .......................... 405/37 |
| 3,620,248 | A | * | 11/1971 | Cary | .......................... 137/353 |
| 3,833,013 | A | * | 9/1974 | Leonard | ..................... 137/171 |
| 4,182,357 | A | * | 1/1980 | Ornstein | ........................ 137/1 |
| 4,739,789 | A | * | 4/1988 | Hamilton | .................... 137/78.2 |
| 4,922,945 | A | * | 5/1990 | Browne | ..................... 137/78.3 |
| 4,989,628 | A | | 2/1991 | Gil et al. | |
| 5,273,066 | A | * | 12/1993 | Graham et al. | ............. 137/78.3 |
| 2002/0124880 | A1 | | 9/2002 | Tanikawa | |

* cited by examiner

*Primary Examiner*—John Rivell
*Assistant Examiner*—Cloud K Lee
(74) *Attorney, Agent, or Firm*—Workman Nydegger

(57) ABSTRACT

A liquid flow control device includes an annular housing having an inlet for liquid in one periphery of the housing and an outlet for liquid in the other periphery. An annular block of water swellable material is located in the housing. A layer of sealing material encircles the annular block on the side thereof adjacent the inlet to close the inlet when the block is swollen through contact with the liquid.

9 Claims, 4 Drawing Sheets

LIQUID FLOW CONTROL DEVICES

CROSS-REFERENCE TO RELATED APPLICATIONS

This application claims priority to United Kingdom Application No. 0516530.3, filed Aug. 11, 2005, which is incorporated herein by specific reference.

BACKGROUND OF THE INVENTION

1. The Field of the Invention
This invention relates to liquid flow control devices.
2. The Relevant Technology
Many different forms of valving arrangements are known for controlling liquid flow through a port or passageway. Such arrangements include the use of liquid swellable material which enlarge with contact with a liquid to obstruct a passageway or port and which shrink when not in contact with a liquid to allow flow through the passageway or port. Such arrangements can be utilized in automatic on/off systems for controlling liquid flow such as systems for watering for horticultural or agricultural applications.

SUMMARY OF THE INVENTION

This invention provides a liquid flow control device comprising an annular housing having an inlet for liquid in one periphery of the housing and an outlet for liquid in the other periphery, an annular block of water swellable material located in the housing and a layer of sealing material encircling the annular block on the side thereof adjacent the periphery having the inlet to seal with that periphery when the block is swollen through contact with the liquid.

In one arrangement according to the invention the periphery of the housing formed with the inlet is the inner periphery of the housing which is formed with a plurality of orifices for liquid to flow into the housing and the outer periphery of the housing is opened to permit release of the liquid from the housing when the orifices are not closed by the water swellable block.

More specifically the outer periphery of the housing has an encircling ring to restrict expansion of the block outwardly with an orifice or orifices for release of liquid from the housing.

In any of the above arrangements the housing may be formed or connected to a closed end of a tube or coupling body providing a passageway which leads to the inner periphery of the housing for flow of liquid through the passageway into the housing.

Also in any of the above arrangements the sealing layer may have a U shaped cross-section in which the annular block of swellable material is located so that the sealing layer extends around the inner periphery of the block and over the sides of the block.

BRIEF DESCRIPTION OF THE DRAWINGS

The following is a description of some specific embodiments of the invention reference being made to the accompanying drawings in which.

DETAILED DESCRIPTION OF THE PREFERRED EMBODIMENTS

Figure 1:
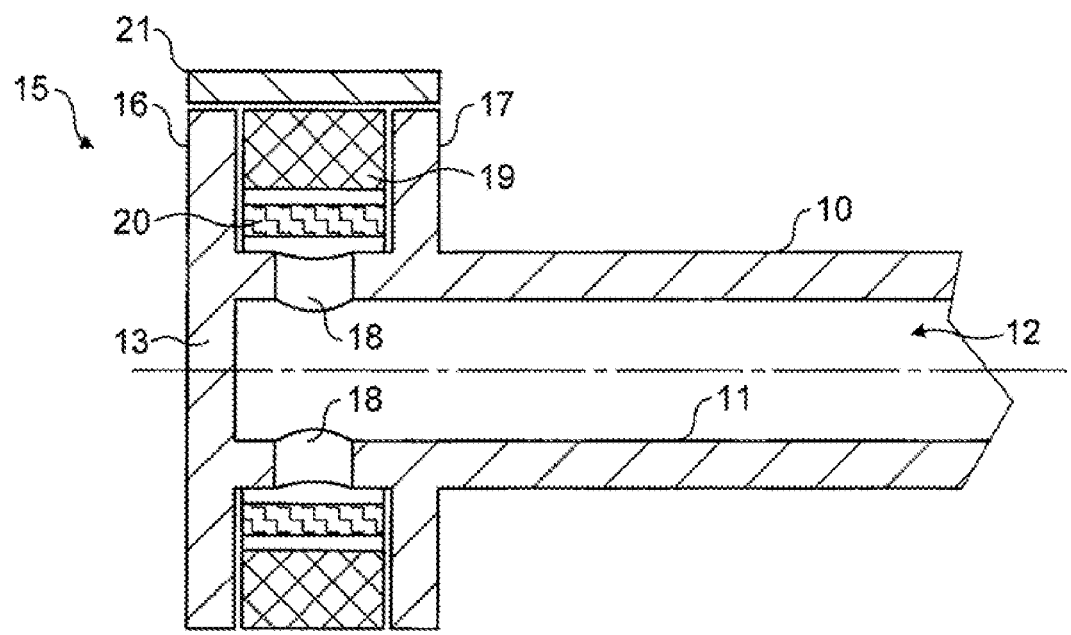
FIG. 1 is a diagrammatic view of a conduit having a flow control device at one end of the conduit.
Figure 6:
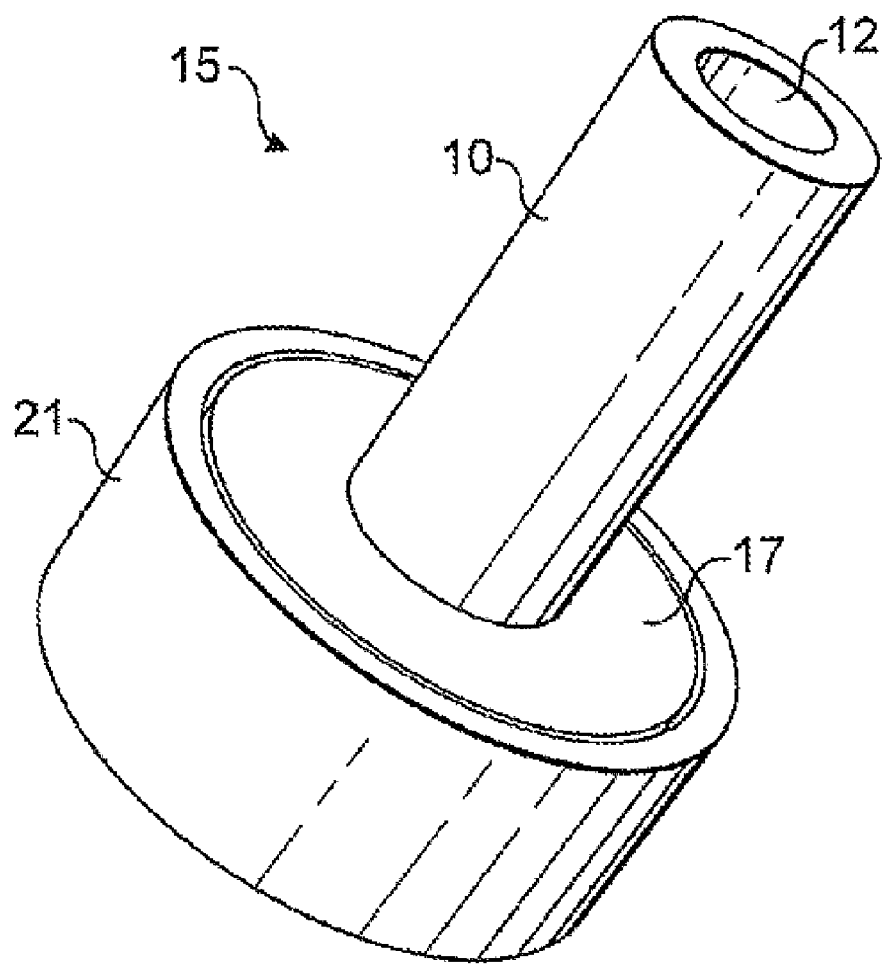
FIG. 6 is a perspective view of the conduit and flow control device shown in FIG. 1 or FIG. 2.

Referring firstly to FIGS. 1 and 6 of the drawings there is shown a flow control valve comprising a conduit 10 providing a passageway 11 connected at one end to a water supply which flows in the direction indicated by the arrow 12 into the conduit. The other end of the conduit is closed by an end wall 13 and an annular housing 15 is formed around the end part of the conduit by a pair of radially extending annular walls 16, 17. The conduit wall between side walls 16, 17 provides the inner periphery of the housing and is formed with spaced orifices 18 for flow of liquid from the conduit into the housing. The outer periphery of the housing is opened to permit release of liquid from the housing.

The housing contains an annular block of water swellable material 19 having an inner annular liner receiving material 20 which is shown spaced from the block in the drawing but in practice would be a snug fit around the inner periphery of the block.

Water flow through the housing from the orifices 18 passes over the water swellable material block 19 causing the block to swell. An annular block swells or expands outwardly longitudinally and radially and in so doing its inner diameter expands inwardly. Eventually swelling of the block will cause the annular liner 20 to be pressed against the inner peripheral wall of the housing closing the orifices 18 and therefore terminating liquid flow into the housing.

When it is not contacted by water, the water swellable block will gradually dry out and in the process shrink to release the sealing layer from the orifices 18 allowing water flow through the housing to be re-established.

Optionally an annular ring or body 21 may encircle the outer periphery of the housing to constrain the water swellable block 19 against excess outward expansion.

Figure 2:
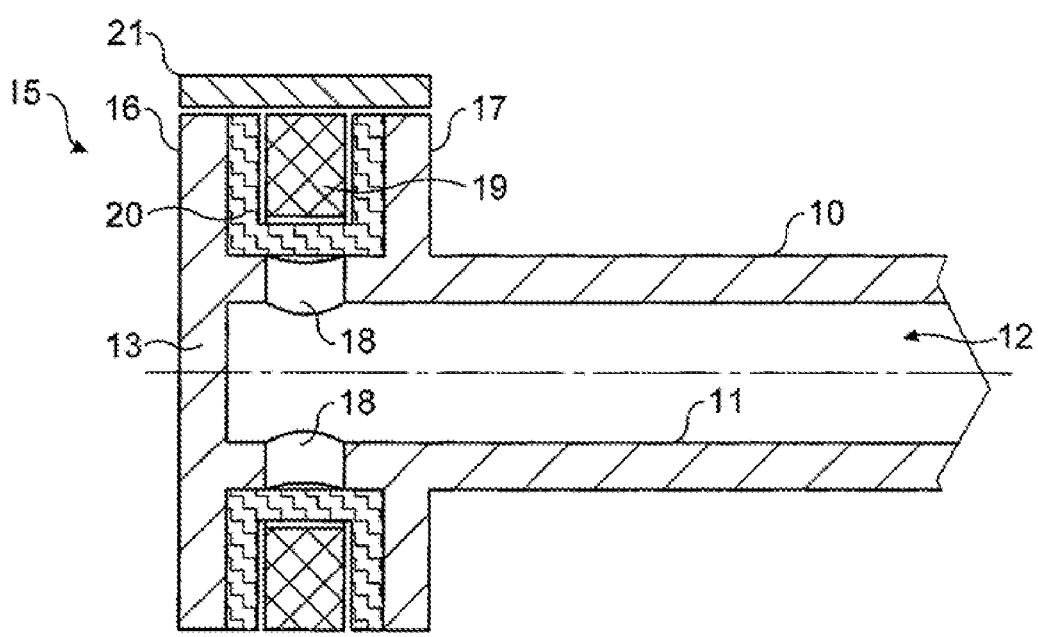
FIG. 2 is a similar view showing a modified form of the flow control valve.

FIG. 2 of the drawings shows a modified arrangement which is generally similar to that of FIG. 1 and like parts have been allotted the same reference numerals. The main difference is that the annular liner 20 is U shaped in cross-section to encapsulate the block 19 of water swellable material leaving only the outer peripheral surface of the block exposed to contact with water flow through the housing and to dry out when the water flow terminates to allow the block to shrink.

Figure 3:
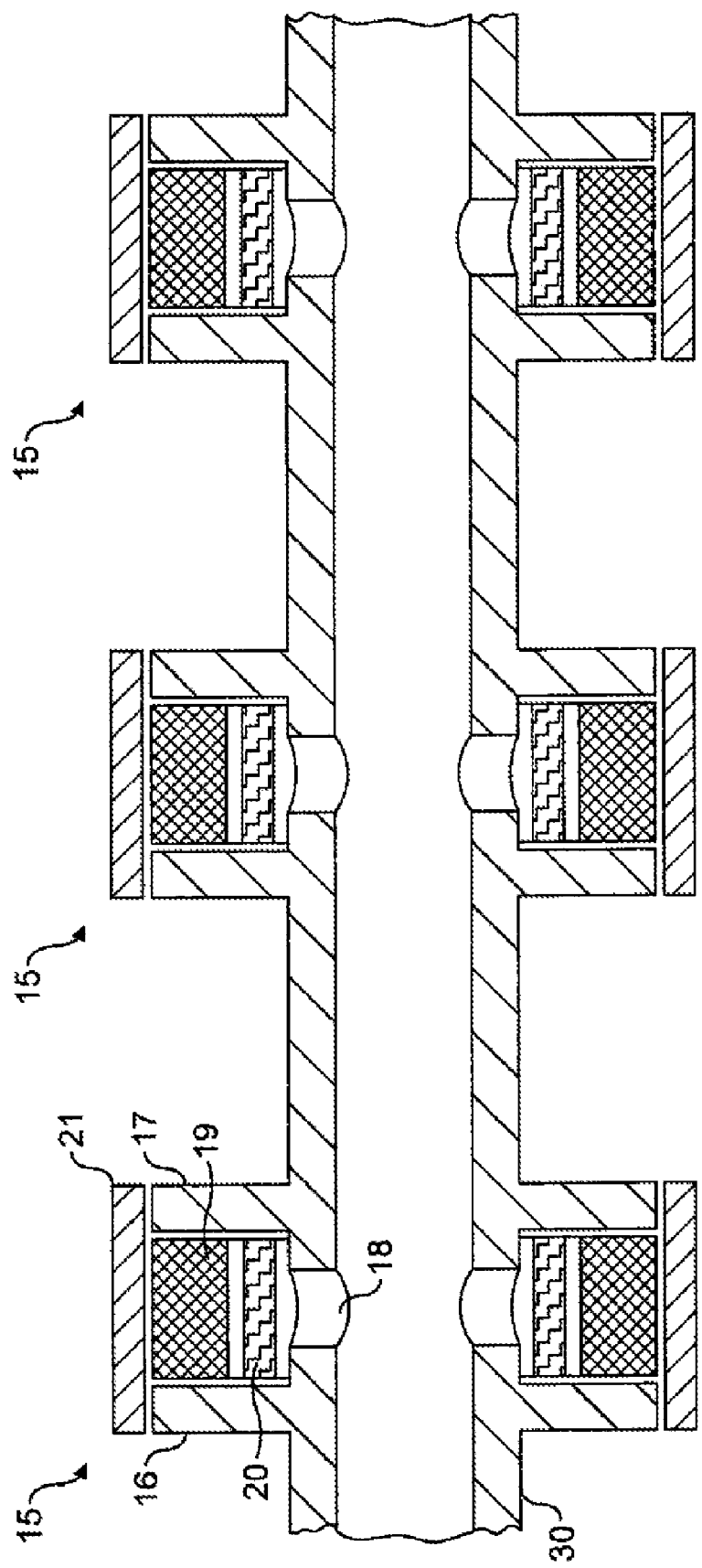
FIG. 3 shows a number of flow control valves in accordance with the invention connected in a conduit in series.

Referring now to FIG. 3 of the drawings, there is shown an application of the invention in which a plurality of flow control valves as described above are located in series along a conduit 30. The conduit is connected in a water supply and each flow control valve provides a controlled outlet from the conduit for release of water to the surrounding environment. The arrangement is particularly suitable for use in horticulture where plants in an area of cultivated ground require periodic application of water. A conduit containing the flow control valves can be located on or in the ground for delivering water supplies at required locations.

Figure 4:
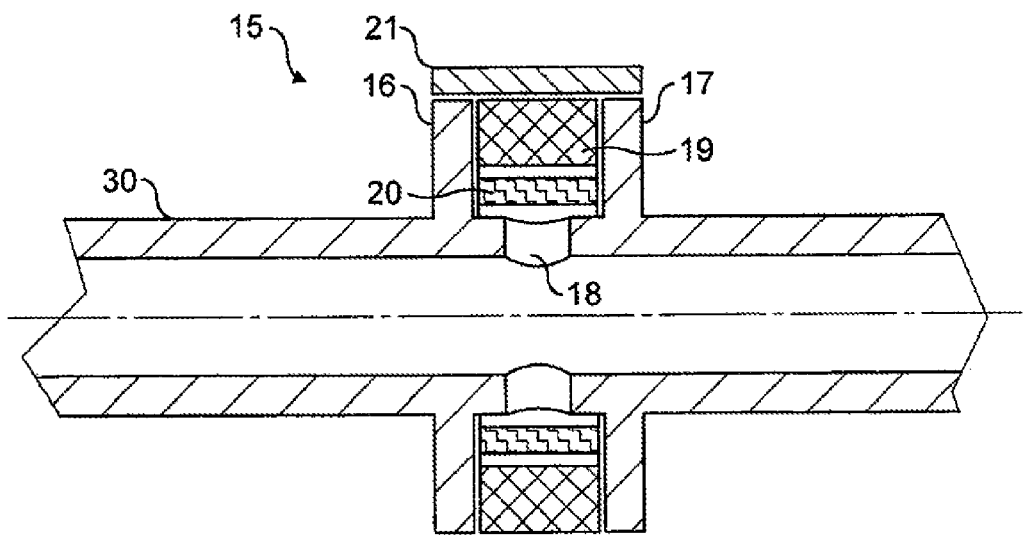
FIG. 4 is a detailed view of one of flow control valve as shown in FIG. 1 connected in a conduit.
Figure 5:
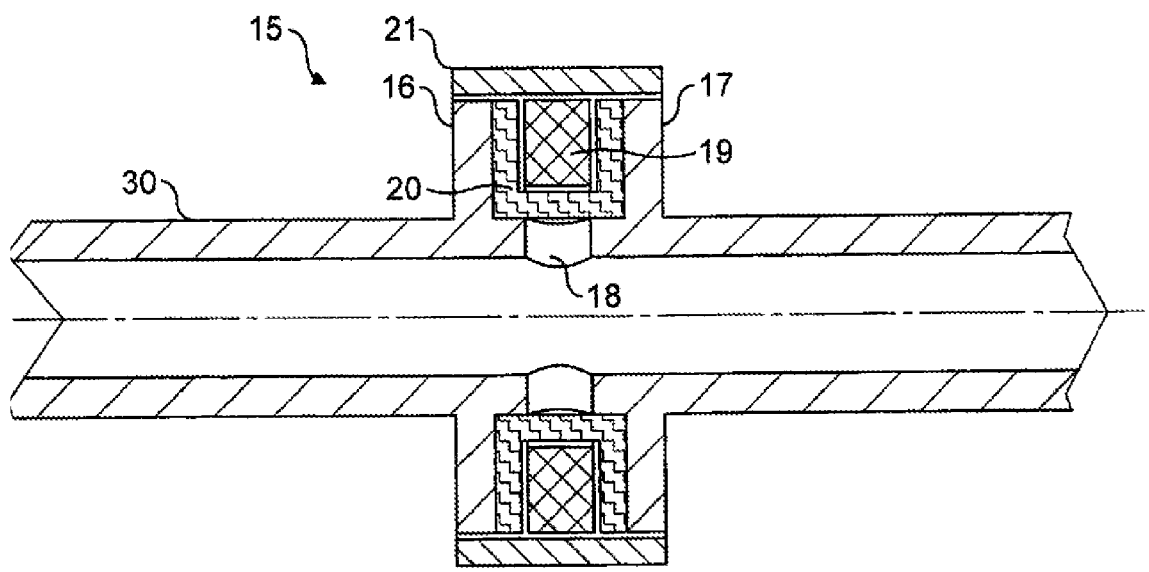
FIG. 5 is a detailed view of a flow control valve as shown in FIG. 2 connected in a conduit.

FIG. 4 is an enlarged view of a valve of the construction shown in FIG. 1 incorporated in a conduit and FIG. 5 is an enlarged view of a valve of the construction shown in FIG. 2 incorporated in a conduit.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A liquid flow control device comprising:
    a housing having an annular inner wall extending between a first side wall and a second side wall, the inner wall forming an inner periphery, the first and second side walls extending radially outward from the inner wall to an outer periphery, the first and second side walls and the inner wall together defining an annular chamber, the housing having an inlet disposed at the inner periphery for passage of liquid into the chamber, the housing having an outlet in the outer periphery for passage of liquid out of the chamber;
    an annular block of water swellable material located in the chamber so as to encircle the inner wall; and
    a layer of sealing material encircling the annular block of water swellable material on the side thereof adjacent the inner periphery to seal with the inner periphery when the annular block of water swellable material is swollen through contact with the liquid as the liquid passes from the inlet to the outlet of the housing;
    wherein the inlet comprises a plurality of orifices in the inner periphery of the housing for liquid to flow into the housing and the outer periphery of the housing has an opening to permit release of the liquid from the housing when the inlet orifices are not closed by the annular block of water swellable material.

2. The liquid flow control device as claimed in claim 1, further comprising a body disposed at the outer periphery of the housing, the body being configured to restrict outward expansion of the annular block of water swellable material, wherein the outlet of the housing comprises one or more orifices formed in the body for release of liquid from the housing.

3. The liquid flow control device as claimed in claim 1, wherein the housing is formed at or connected to a closed end of a tube or coupling body that provides a passageway that fluidly communicates with the inlet at the inner periphery of the housing for flow of liquid through the passageway into the housing.

4. A liquid flow control system comprising a liquid flow control device as claimed in claim 1 fluidly connected to a conduit.

5. The liquid flow control system as claimed in claim 4, wherein the liquid flow control device and conduit are configured such that liquid flows into the system through the conduit and out of the system through the liquid flow control device.

6. A liquid flow control system comprising a plurality of liquid flow control devices as claimed in claim 1 fluidly connected to a conduit.

7. The liquid flow control device as claimed in claim 1, farther comprising a ring encircling the outer periphery of the housing so as to farther define the annular chamber, the ring restricting outward radial expansion of the annular block of water swellable material.

8. A liquid flow control device comprising:
    a housing having an annular inner wall extending between a first side wall and a second side wall, the first and second side walls extending radially outward from the inner wall to an outer periphery, the first and second side walls and the inner wall together defining a chamber, an inlet being formed on the inner wall and an outlet being disposed at the outer periphery, the inlet and the outlet each being in fluid communication with the chamber;
    a mass of water swellable material disposed within the chamber so as to encircle the inner wall; and
    a seal disposed within the chamber, the seal being movable between:
        a first position which allows liquid to pass through the inlet and flow through the chamber to the outlet such that the liquid contacts the mass of water swellable material as the liquid flows through the chamber, and
        a second position which prevents liquid from passing through the inlet into the chamber, the seal being disposed at the second position when the mass of water swellable material is swollen by contact with the liquid flowing through the chamber.

9. The liquid flow control device as claimed in claim 8, further comprising a ring encircling the outer periphery of the housing so as to further define the chamber, the ring restricting outward radial expansion of the mass of water swellable material.

* * * * *

UNITED STATES PATENT AND TRADEMARK OFFICE
CERTIFICATE OF CORRECTION

PATENT NO. : 7,506,658 B2
APPLICATION NO. : 11/463267
DATED : March 24, 2009
INVENTOR(S) : Guest et al.

It is certified that error appears in the above-identified patent and that said Letters Patent is hereby corrected as shown below:

Column 1
Line 60, change "invention" to --invention,--

Column 2
Line 1, change "one of" to --one of a--
Line 33, change "Eventually" to --Eventually,--

Column 4
Line 13, change "farther" to --further--
Line 14, change "farther" to --further--

Signed and Sealed this

Twenty-seventh Day of October, 2009

David J. Kappos
*Director of the United States Patent and Trademark Office*